(12) United States Patent
Ochiai et al.

(10) Patent No.: US 7,060,642 B2
(45) Date of Patent: Jun. 13, 2006

(54) REFRACTORY RAW MATERIALS, METHOD FOR PRODUCTION THEREOF AND REFRACTORY USING THE MATERIAL

(75) Inventors: Tsunemi Ochiai, 3-6, Higashikanmaki 2-chome, Takatsuki-shi, Osaka (JP) 569-0002; Shigeyuki Takanaga, Okayama (JP)

(73) Assignees: Tsunemi Ochiai, Takatsuki (JP); Kyushu Refractories Co., Ltd., Bizen (JP)

( * ) Notice: Subject to any disclaimer, the term of this patent is extended or adjusted under 35 U.S.C. 154(b) by 180 days.

(21) Appl. No.: 10/469,532

(22) PCT Filed: Mar. 6, 2002

(86) PCT No.: PCT/JP02/02086

§ 371 (c)(1),
(2), (4) Date: Sep. 8, 2003

(87) PCT Pub. No.: WO02/072476

PCT Pub. Date: Sep. 19, 2002

(65) Prior Publication Data

US 2004/0106509 A1 Jun. 3, 2004

(30) Foreign Application Priority Data

Mar. 8, 2001 (JP) .............................. 2001-065369
Apr. 17, 2001 (JP) .............................. 2001-118216

(51) Int. Cl.
*C04B 35/52* (2006.01)

(52) U.S. Cl. ........................................ 501/99; 501/101

(58) Field of Classification Search ................ 423/448, 423/449.2; 501/99, 101
See application file for complete search history.

(56) References Cited

U.S. PATENT DOCUMENTS

| | | | | |
|---|---|---|---|---|
| 3,280,231 A | * | 10/1966 | Bentolila et al. | 264/29.7 |
| 3,926,857 A | * | 12/1975 | Matkin et al. | 252/516 |
| 5,246,897 A | | 9/1993 | Ono et al. | |
| 6,037,400 A | * | 3/2000 | Kitahata et al. | 524/495 |
| 2002/0051903 A1 | * | 5/2002 | Masuko et al. | 429/44 |

FOREIGN PATENT DOCUMENTS

| | | |
|---|---|---|
| JP | 04-367556 | 12/1992 |
| JP | 05-301772 | 11/1993 |
| JP | 07-017773 | 1/1995 |
| JP | 07-268249 | 10/1995 |
| JP | 10-036177 | 2/1998 |
| JP | 11-322405 | 11/1999 |
| JP | 2000-086334 | 3/2000 |
| JP | 2000-192120 | 7/2000 |
| JP | 2000-273351 | 10/2000 |

* cited by examiner

*Primary Examiner*—David Sample
(74) *Attorney, Agent, or Firm*—Oblon, Spivak, McClelland, Maier & Neustadt, P.C.

(57) ABSTRACT

Refractories obtained by molding a refractory raw material composition containing a refractory raw material including graphite grains having an average grain size of 500 nm or less or a refractory raw material including graphite grains obtained by graphitizing carbon black and a refractory filler. Or refractories containing carbonaceous grains (A) selected from carbon black or graphite grains obtained by graphitizing carbon black and having a DBP absorption (x) of 80 ml/100 g or more, carbonaceous grains (B) selected from carbon black and graphite grains obtained by graphitizing carbon black and having a DBP absorption (x) of less than 80 ml/100 g, and a refractory filler. Refractories excellent in corrosion resistance, oxidation resistance and thermal shock resistance, especially carbon-contained refractories having a low carbon content are thereby provided.

14 Claims, 2 Drawing Sheets

SCHEMATIC VIEW OF CARBON BLACK IN THE FORM OF AN AGGREGATE

SCHEMATIC VIEW OF CARBON BLACK IN THE FORM OF AN AGGREGATE

X-RAY DIFFRACTION CHART OF GRAPHITE GRAINS C

Figure 1:
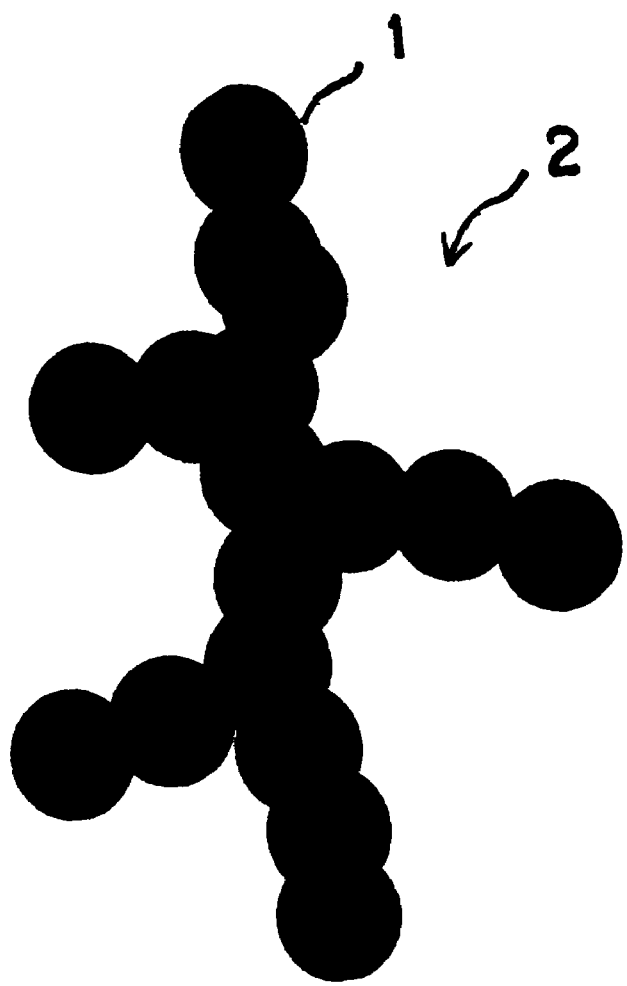

REFRACTORY RAW MATERIALS, METHOD FOR PRODUCTION THEREOF AND REFRACTORY USING THE MATERIAL

TECHNICAL FIELD

The present invention relates to a refractory raw material comprising graphite grains and a process for producing graphite grains which can be used therein. Further, it relates to a refractory raw material composition containing the same. Still further, it relates to a refractory raw material composition comprising plural types of specific carbonaceous grains selected from carbon black and graphite grains obtained by graphitizing carbon black. Furthermore, it relates to refractories obtained by molding the refractory raw material composition, especially, refractories excellent in corrosion resistance, oxidation resistance and thermal shock resistance and advantageous as a lining of refining containers.

BACKGROUND ART

Since carbon has a property that it is hardly wetted with a melt such as a slag, carbon-contained refractories have an excellent durability. Accordingly, in recent years, they have been widely used as lining refractories of various molten metal containers. For example, when magnesia is used as a refractory filler, an excellent durability is exhibited as lining refractories of molten metal containers because of the property provided by carbon and a corrosion resistance to melt provided by magnesia.

However, as carbon-contained refractories have been increasingly used, elution of carbon of refractories in molten steel which is so-called carbon pickup has been problematic. Especially, in recent years, high-quality steel has been required more severely, and refractories having a lower carbon content has been in high demand. Meanwhile, from the aspect of inhibition of heat dissipation from containers or environmental protection such as energy saving, the use of refractories having a low thermal conductivity has been required. From this standpoint as well, refractories having a low carbon content has been demanded.

As carbonaceous raw materials used in carbon-contained refractories, flake graphite, a pitch, a coke, mesocarbon and the like have been so far mainly used. For obtaining refractories having a low carbon content, the mere reduction of the use amount of these carbonaceous raw materials has involved a problem of the decrease in thermal shock resistance. In order to solve this problem, official gazette of JP-A-5-301772 proposes refractories in which expanded graphite is used as a carbonaceous raw material. Examples thereof describe a magnesia carbon brick obtained by kneading a refractory raw material composition comprising 95 parts by weight of sintered magnesia, 5 parts by weight of expanded graphite and 3 parts by weight of a phenol resin, press-molding the composition and then heat-treating the molded product at 300° C. for 10 hours. It is described that a spalling resistance is improved in comparison to the use of the same amount of flake graphite.

Official gazette of JP-A-11-322405 discloses carbon-contained refractories having a low carbon content, characterized in that in a raw material blend comprising a refractory raw material and a carbonaceous raw material containing carbon, a fixed carbon content of the carbonaceous raw material is from 0.2 to 5% by weight per 100% by weight of a hot residue of the raw material blend and carbon black is used in at least a part of the carbonaceous raw material (claim 5). In the official gazette, it is explained that since carbon black has a small grain size of approximately 0.1 µm, a dispersibility in a refractory texture is significantly high, surfaces of filler grains can be coated with fine carbon grains, and the contact of filler grains can be blocked even at a high temperature over a long period of time to inhibit excessive sintering. Examples describe refractories formed by molding a raw material blend obtained by blending a refractory filler comprising 50 parts by weight of magnesia and 50 parts by weight of alumina with 2.5 parts by weight of a phenol resin, 1 part by weight of a pitch and 1 part by weight of carbon black (thermal) and baking the molded product at from 120 to 400° C., indicating that the refractories are excellent in spalling resistance and resistance to oxidative damage.

Official gazette of JP-A-2000-86334 describes a brick for a sliding nozzle apparatus obtained by adding from 0.1 to 10% by weight, based on outer percentage, of carbon black having a specific surface area of 24 $m^2/g$ or less to a blend comprising a refractory filler and a metal, further adding an organic binder, kneading the mixture, molding the resulting mixture and then heat-treating the molded product at a temperature of from 150 to 1,000° C. It is indicated that the incorporation of specific carbon black (thermal class or thermal black class) in a spherical form having a large grain size of from 80 to 500 nm provides a good packing property and a dense brick texture to decrease a porosity and used carbon black itself is also excellent in oxidation resistance, whereby refractories excellent in oxidation resistance are obtained. Examples describe refractories obtained by molding a blend comprising 97 parts by weight of alumina, 3 parts by weight of aluminum, 3 parts by weight of a phenol resin, 3 parts by weight of a silicon resin and 3 parts by weight of carbon black and heating the molded product at a temperature of 500° C. or less, indicating that the refractories are excellent in oxidation resistance.

Official gazette of JP-A-7-17773 describes monolithic refractories in which from 0.1 to 3% by weight of spherical carbon black having a large grain size of from 0.02 to 0.50 µm and imperfect in structure development is added to a refractory filler. Further, official gazette of JP-A-10-36177 describes a blast furnace taphole mud containing from 2 to 15% by weight of carbon black having a DBP absorption of 100 ml/100 g or less and fixed amounts of a carbonaceous raw material, silicon carbide, silicon nitride, a refractory raw material and a carbon-containing binder. Still further, official gazette of JP-A-2000-192120 describes a taphole mud comprising a refractory filler, carbon black having a DBP absorption of from 15 to 80 ml/100 g, a pitch and a binder.

On the other hand, official gazette of JP-A-2000-273351 discloses a process for producing graphitized carbon black, which comprises heat-treating a mixture containing carbon black and a graphitization-promoting substance at from 2,000 to 2,500° C. The temperature of approximately 2,800° C. so far required for graphitization of carbon black can be reduced to from 2,000 to 2,500° C. by heating along with a graphitization-promoting substance made of an element such as boron, silicon, aluminum or iron or its compound.

However, as described in JP-A-5-301772, the use of expanded graphite as a carbonaceous raw material can provide a good thermal shock resistance even in low-carbon refractories in which the use amount thereof is approximately 5% by weight as compared to the use of flake graphite in the same amount. Nevertheless, expanded graphite is a highly bulky raw material. Accordingly, even when the use amount is as small as approximately 5% by weight, a packing property of refractories is decreased, and a corrosion resistance to melt is poor. Moreover, the oxidative loss of the carbonaceous raw material during use of refractories was also a serious problem.

Official gazettes' of JP-A-11-322405, JP-A-2000-86334, JP-A-7-17773, JP-A-10-36177 and JP-A-2000-192120 all describe examples of using carbon black as a carbonaceous raw material. Although the employment of carbon black was deemed to improve a spalling resistance, a corrosion resistance and an oxidation resistance were still insufficient. Further, carbon black used includes carbon black having a specific surface area of less than 24 $m^2/g$, spherical carbon black having a large grain size and imperfect in structure development and carbon black having a DBP absorption of less than 100 ml/100 g or from 15 to 80 ml/100 g. That is, carbon black having a large grain size with a low DBP (dibutyl phthalate) absorption is deemed to be rather preferable. The employment of such a carbon black was, however, still insufficient to improve a thermal shock resistance.

Further, for forming a dense texture or improving an oxidation resistance, a method in which a powder of a single substance of aluminum, silicon, magnesium or the like or a powder of a compound except an oxide, such as boron carbide or silicon carbide, was mainly employed. In this method, however, for obtaining sufficient effects, these additives had to be used in large amounts, which had, in many cases, an adverse effect on other characteristics consequently. For this reason, there was no choice but to make a compromise at some level.

Official gazette of JP-A-2000-273351 describes a process in which carbon black and a graphitization-promoting substance such as boron are heat-treated for graphitization. However, it is used in a carrier for a catalyst of a phosphoric acid-type fuel cell, and there is nothing to describe or suggest that such a graphitized carbon black is useful as a raw material of refractories.

The invention has been made for solving the foregoing problems. It is an object of the invention to provide refractories excellent in corrosion resistance, oxidation resistance and thermal shock resistance, especially, carbon-contained refractories having a low carbon content. Such carbon-contained refractories having a low carbon content are useful because carbon pickup in molten steel is reduced and heat dissipation from containers is decreased. Another object of the invention is to provide a refractory raw material and a refractory raw material composition for obtaining such refractories. Still another object of the invention is to provide a process for producing graphite grains which can be used in them. A further object of the invention is to provide a process for producing the refractory raw material composition.

DISCLOSURE OF THE INVENTION

Refractories comprise grains having a wide variety of grain sizes ranging from coarse grains having a size of approximately 5 mm to fine grains having a size of less than 1 μm, and an aggregate of fine grains which fill spaces of relatively large grains, the aggregate being called a matrix, greatly influences a durability. In the matrix portion, a large number of pores or voids are present, and influence a strength of refractories, a permeability of a melt such as a slag, relaxation of a thermal shock and the like.

A grain size of a matrix in refractories is generally deemed to be less than 44 μm. Meanwhile, the present inventors have focused on the fact that a behavior of ultrafine grains having a size of less than 10 μm, further less than 1 μm, namely a size in the nanometer order has a great influence. In carbon-contained refractories, a carbonaceous raw material is, in most cases, used in the matrix portion. Studies have been made to control properties of overall refractories by controlling a carbonaceous raw material in the nanometer order.

The inventors have conducted investigations upon focussing on the control of the porous structure in controlling the carbonaceous raw material in the nanometer order. The reduction of the amount of pores leads to the improvement in corrosion resistance, and the control of the form (specific surface area) of the pores or the fine division thereof can contribute to providing an appropriate dynamic elastic modulus or improving a thermal shock resistance. Thus, they have intended to improve, by controlling the porous structure, the thermal shock resistance and further the corrosion resistance and the oxidation resistance.

As a carbonaceous raw material which is fine grains in the nanometer order, carbon black is known. The porous structure can be controlled to some extent by controlling the grain size. Nevertheless, when carbon black is used as a matrix material, the corrosion resistance and the oxidation resistance are, in many cases, not necessarily sufficient. Consequently, assiduous studies have been made on a method for improving the corrosion resistance and the oxidation resistance of carbon black itself with the grain size unchanged.

That is, the first invention is a refractory raw material comprising graphite grains having an average grain size of 500 nm or less. Since graphite is developed in crystal structure as compared to carbon black, it is a material which has a high oxidation-initiating temperature, is excellent in oxidation resistance and also in corrosion resistance, and has a high thermal conductivity. The use of fine graphite grains in the nanometer order can divide pores to control the porous structure and further improve the corrosion resistance and the oxidation resistance of grains per se, with the result that refractories excellent in thermal shock resistance, corrosion resistance and oxidation resistance are obtained.

Further, the first invention is a refractory raw material comprising graphite grains obtained by graphitizing carbon black. This is because carbon black is carbonaceous fine grains with the grain size in the nanometer order which can currently be procured easily and products with various trade names can easily be obtained according to purposes in view of a grain size, an aggregation condition, a surface condition and the like.

It is preferable that the graphite grains contain at least one element selected from metals, boron and silicon. This is because formation of, so to speak, "composite graphite grains" in which graphite grains contain such an element except carbon further increases the oxidation-initiating temperature of graphite grains per se, improves the oxidation resistance and the corrosion resistance and also improves the oxidation resistance and the corrosion resistance of refractories obtained by using the composite graphite grains as a raw material.

It is preferable that the graphite grains containing at least one element selected from metals, boron and silicon are obtained by heating carbon black and a simple substance of at least one element selected from metals, boron and silicon or a compound containing the element. It is more preferable that the graphite grains are obtained by heating carbon black and a simple substance of at least one element selected from metals, boron and silicon.

Further, the invention is a refractory raw material composition comprising a refractory filler and the graphite grains. At this time, a refractory raw material composition comprising 100 parts by weight of the refractory filler and from 0.1 to 10 parts by weight of the graphite grains is preferable.

Still further, the invention is a process for producing graphite grains containing at least one element selected from metals, boron and silicon, characterized by heating carbon black and an alcoholate of at least one element selected from metals, boron and silicon. This is because when an element which is dangerous in the form of a simple substance because of easy explosion is formed into an alcoholate, it becomes easy to handle, and a risk of dust explosion or the like is reduced. At this time, when the graphite grains produced by the process of the invention are used as a refractory raw material as mentioned above, the problems of the invention are, needless to say, resolved. Moreover, the process of the invention is useful because it can also be used for other purposes. This point is also the same with the following two processes.

Moreover, the invention is a process for producing graphite grains containing at least one element selected from metals, boron and silicon, characterized by heating carbon black, an oxide of at least one element selected from metals, boron and silicon and a metal reducing the oxide. With such a combination, the element constituting the oxide can easily be reduced and contained in graphite.

In addition, the invention is a process for producing graphite grains, which comprises heating carbon black and a simple substance of at least one element selected from metals, boron and silicon or a compound containing the element, and further oxidizing the resulting graphite grains. Consequently, the more improved oxidation resistance is provided.

Meanwhile, a porous structure can be controlled to some extent by controlling the grain size of carbon black. As stated above, however, with the mere use of carbon black having a low DBP absorption, the thermal shock resistance is still insufficient. On the other hand, with the mere use of carbon black having a high DBP absorption, the oxidation resistance and the corrosion resistance are insufficient as will be later described in Comparative Examples. The second invention has been attained as a result of assiduous studies to solve such problems.

That is, the second invention is a refractory raw material composition comprising carbonaceous grains (A) selected from carbon black and graphite grains obtained by graphitizing carbon black and having a DBP absorption (x) of 80 ml/100 g or more, carbonaceous grains (B) selected from carbon black and graphite grains obtained by graphitizing carbon black and having a DBP absorption (x) of less than 80 ml/100 g, and a refractory filler. The DBP absorption (x) here referred to is a value (ml/100 g) measured by a method defined in A method of "DBP Absorption" in item 9 of JIS K6217.

The use of carbonaceous grains (A) selected from carbon black and graphite grains obtained by graphitizing carbon black and having a high DBP absorption can form quite a fine porous structure in a matrix of refractories, provide an appropriate dynamic elastic modulus and improve a thermal shock resistance. The dynamic elastic modulus is an index of the thermal shock resistance. The lower the dynamic elastic modulus, the better the thermal shock resistance. Refractories excellent in thermal shock resistance can inhibit spalling damage when actually used. However, the mere use of the carbonaceous grains (A) is insufficient in oxidation resistance and corrosion resistance. The combined use of carbonaceous grains (B) having a low DBP absorption can improve this point, with the result that refractories excellent in thermal shock resistance, corrosion resistance and oxidation resistance are obtained.

At this time, it is preferable that the total weight of the carbonaceous grains (A) and the carbonaceous grains (B) is from 0.1 to 10 parts by weight per 100 parts by weight of the refractory filler and the weight ratio (A/B) of the carbonaceous grains (A) to the carbonaceous grains (B) is from 1/99 to 99/1. It is also preferable that the average primary grain size of the carbonaceous grains (A) is from 10 to 50 nm and the average primary grain size of the carbonaceous grains (B) is from 50 to 500 nm.

It is preferable that the ratio (x/y) of the DBP absorption (x) of the carbonaceous grains (A) to the DBP absorption (y) of the compressed sample of the carbonaceous grains (A) is 1.15 or more. The DBP absorption (y) of the compressed sample here referred to is a value (ml/100 g) measured by the method defined in "DBP Absorption of Compressed Sample" in item 10 of JIS K6217. Carbonaceous grains whose DBP absorption after compression is decreased indicate that the structure of carbonaceous grains is changed by a compression procedure. Specifically, it suggests formation of an aggregate in which primary grains are aggregated. The use of such carbonaceous grains (A) can provide the excellent thermal shock resistance.

In view of improving the oxidation resistance and the corrosion resistance, it is preferable that at least the carbonaceous grains (A) or the carbonaceous grains (B) are graphite grains obtained by graphitizing carbon black, and it is more preferable that both of the carbonaceous grains (A) and the carbonaceous grains (B) are graphite grains obtained by graphitizing carbon black. The use of graphite grains improves the corrosion resistance and the oxidation resistance of grains per se, with the result that refractories excellent in thermal shock resistance, corrosion resistance and oxidation resistance are obtained.

In view of improving the oxidation resistance and the corrosion resistance, it is more preferable that at least the carbonaceous grains (A) or the carbonaceous grains (B) are graphite grains obtained by graphitizing carbon black and the graphite grains contain at least one element selected from metals, boron and silicon, and it is most preferable that both of the carbonaceous grains (A) and the carbonaceous grains (B) are graphite grains obtained by graphitizing carbon black and the graphite grains contain at least one element selected from metals, boron and silicon. This is because formation of, so to speak, "composite graphite grains" in which graphite grains contain such an element except carbon further increases the oxidation-initiating temperature of graphite grains per se, improves the oxidation resistance and the corrosion resistance and also improves the oxidation resistance and the corrosion resistance of refractories obtained by using the composite graphite grains as a raw material.

In producing the refractory raw material composition, it is preferable to previously disperse the carbonaceous grains (A) in an organic binder and then mix the dispersion with the other raw materials because the dispersibility of the carbonaceous grains (A) in the matrix can be improved and consequently refractories improved in thermal shock resistance, oxidation resistance and corrosion resistance can be obtained.

In the refractory raw material composition in the first and second inventions, a refractory raw material composition in which a refractory filler comprises magnesia is preferable in consideration of useful applications of refractories having a low carbon content. Further, the invention is a refractory which is obtained by molding the refractory raw material composition.

The Invention is Described in Detail Below.

The first invention is a refractory raw material comprising graphite grains having an average grain size of 500 nm or less. It is here important that the average grain size is 500 nm or less, and the use of the graphite grains having such a fine grain size can provide a fine porous structure in the matrix of refractories. Flake graphite and expanded graphite used so far as a refractory raw material both had a grain size greatly exceeding 1 µm and could not develop a fine porous structure in a matrix. Such a porous structure can be realized upon using the fine graphite grains of the invention.

The average grain size is preferably 200 nm or less, more preferably 100 nm or less. Further, the average grain size is usually 5 nm or more, preferably 10 nm or more. When the average grain size exceeds 500 nm, a fine porous structure cannot be provided. When it is less than 5 nm, grains are difficult to handle. The average grain size here referred to indicates a number average grain size of primary grains of graphite grains. Accordingly, in case of, for example, grains having a structure that plural primary grains are aggregated, a number average grain size is calculated on condition that plural primary grains constituting the same are contained. Such a grain size can be measured by observation with an electron microscope.

A process for producing graphite grains is not particularly limited, and graphite having a larger grain size may be pulverized to the foregoing grain size mechanically or electrically. However, since it is difficult to pulverize grains into quite fine grains having a grain size of 500 nm or less, a process in which carbonaceous grains originally having a grain size of 500 nm or less are graphitized is preferable.

Moreover, the invention is a refractory raw material comprising graphite grains obtained by graphitizing carbon black. Carbon black is carbonaceous fine grains with a grain size in the nanometer order which can easily be procured, and grains with various trade names can easily be obtained according to purposes in view of a grain size, an aggregation condition, a surface condition and the like. It is already known that carbon black itself is used as a refractory raw material as described in column Prior Art. However, carbon black was insufficient in corrosion resistance and oxidation resistance. By graphitizing it, the crystal structure is developed, and a material which is high in oxidation-initiating temperature, excellent in oxidation resistance and also in corrosion resistance and high in thermal conductivity can be formed.

Carbon black as a raw material is not particularly limited. Carbon black comprising primary grains having a size of 500 nm or less is preferably used. Specifically, any of furnace black, channel black, acetylene black, thermal black, lamp black, Ketjen black and the like can be used.

Preferable examples thereof include various carbon blacks such as first extruding furnace black (FEF), super abrasion furnace black (SAF), high abrasion furnace black (HAF), fine thermal black (FT), medium thermal black (MT), semi-reinforcing furnace black (SRF) and general-purpose furnace black (GPF). At this time, plural types of carbon blacks may be blended and used as a raw material.

Although a method for graphitizing carbon black is not particularly limited, it can be graphitized by heating at a high temperature in an inert atmosphere. Usually, carbon black can be graphitized by heating at a temperature of more than 2,000° C.

By the graphitization, a peak ascribable to a crystal structure is observed in the X-ray diffraction measurement. As the graphitization proceeds, lattice spacing is shortened. A 002 diffraction line of graphite shifts to a wide-angle region as the graphitization proceeds, and a diffraction angle $2\theta$ of this diffraction line corresponds to the lattice spacing (average spacing). In the invention, it is preferable to use graphite of which the lattice spacing d is 3.47 Å or less. When the lattice spacing exceeds 3.47 Å, the graphitization is insufficient, and the thermal shock resistance, the oxidation resistance and the corrosion resistance might be insufficient.

With respect to the graphite grains, it is preferable that the graphite grains contain at least one element selected from metals, boron and silicon. This is because formation of, so to speak, "composite graphite grains" in which graphite grains contain such an element except carbon further increases the oxidation-initiating temperature of graphite grains per se, improves the oxidation resistance and the corrosion resistance and also improves the oxidation resistance and the corrosion resistance of refractories obtained by using the composite graphite grains as a raw material.

Specific examples of at least one element which is contained in the graphite grains and selected from metals, boron and silicon here include elements such as magnesium, aluminum, calcium, titanium, chromium, cobalt, nickel, yttrium, zirconium, niobium, tantalum, molybdenum, tungsten, boron and silicon. Of these, for improving the oxidation resistance and the corrosion resistance of refractories, boron, titanium, silicon, zirconium and nickel are preferable, and boron and titanium are most preferable.

The way in which each element is present in the graphite grains is not particularly limited, and it may be contained within the grains or so as to cover surfaces of grains. Further, each element can be contained as an oxide, a nitride, a borate or a carbide thereof. It is preferably contained as a compound such as an oxide, a nitride, a borate or a carbide. It is more preferably contained as a carbide or an oxide. $B_4C$ or TiC is shown as a carbide, and $Al_2O_3$ is shown as an oxide.

The carbide is properly contained in the graphite grains in a form bound to a carbon atom constituting graphite. It is, however, undesirable that the total amount of the graphite grains is contained as the carbide because properties as graphite cannot be exhibited. Thus, it is necessary that the graphite grains have the crystal structure of graphite. The condition of such graphite grains can be analyzed by X-ray diffraction. For example, besides the peak corresponding to the crystal of graphite, a peak corresponding to the crystal of the compound such as TiC or $B_4C$ is observed.

A process in which at least one element selected from metals, boron and silicon is contained in the graphite grains is not particularly limited. It is preferable that the graphite grains are obtained by heating carbon black and a simple substance of at least one element selected from metals, carbon and silicon or a compound containing the element. By the heating, the graphitization proceeds, and at the same time, the element is contained in the graphite structure.

At this time, it is more preferable that the graphite grains are obtained by heating carbon black and a simple substance of at least one element selected from metals, boron and silicon. This is because by heating with a simple substance of an element, the reaction can proceed with heat generated during formation of a carbide through burning synthesis. Specifically, it is preferable to conduct the heating with aluminum, calcium, titanium, zirconium, boron or silicon. This is because the synthesis is enabled by a self-burning synthesis method with this reaction heat. Since the reaction heat of its own can be utilized, the temperature inside the furnace can be reduced as compared to the case of graphitizing carbon black alone. Maintaining the furnace temperature over 2,000° C. is quite problematic in view of an apparatus and a cost. Thus, the very point is important.

For example, a reaction formula of the burning synthesis of boron and carbon and a reaction formula of the burning synthesis of titanium and carbon are as follows.

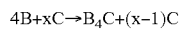

$$4B+xC \rightarrow B_4C+(x-1)C$$

$$Ti+xC \rightarrow TiC+(x-1)C$$

Both of these reactions are exothermic reactions which allow self-burning synthesis.

As a process in which at least one element selected from metals, boron and silicon is contained in the graphite grains, it is also preferable to heat carbon black and an alcoholate of at least one element selected from metals, boron and silicon because of the use of heat generated by burning synthesis. This is because when an element which is dangerous in the form of a simple substance because of easy explosion is formed into an alcoholate, it becomes easy to handle and a risk of dust explosion or the like is reduced.

The alcoholate here referred to is a compound in which hydrogen of a hydroxyl group of an alcohol is substituted with at least one element selected from metals, boron and silicon, as represented by $M(OR)_n$. Here, as M, a monovalent to tetravalent element, preferably a divalent to tetravalent element is used. Preferable examples of the element include magnesium, aluminum, titanium, zirconium, boron and silicon, n corresponds to a valence number of an element M, and it is an integer of from 1 to 4, preferably an integer of from 2 to 4. Further, R is not particularly limited so long as it is an organic group. It is preferably an alkyl group having from 1 to 10 carbon atoms, and examples thereof include a methyl group, an ethyl group, a propyl group, an isopropyl group, an n-butyl group and the like. These alcoholates may be used either singly or in combination. Moreover, it is also possible to use a simple substance or an oxide of an element and an alcoholate thereof in combination.

As a process in which at least one element selected from metals, boron and silicon is contained in the graphite grains, it is preferable to heat carbon black, an oxide of at least one element selected from metals, boron and silicon and a metal reducing the oxide because heat generated by burning synthesis can be utilized. By such a combination, it is possible that a metal reduces an oxide and an element constituting an oxide is contained in graphite. For example, when carbon black, aluminum and boron oxide are heated, boron oxide is first reduced with aluminum to form a simple substance of boron which is reacted with carbon black to obtain boron carbide. This is shown by the following chemical formula.

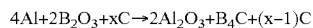

$$4Al+2B_2O_3+xC \rightarrow 2Al_2O_3+B_4C+(x-1)C$$

Further, a chemical formula in case of reacting carbon black, aluminum and titanium oxide is as follows.

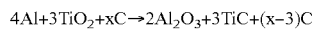

$$4Al+3TiO_2+xC \rightarrow 2Al_2O_3+3TiC+(x-3)C$$

These reactions are also exothermic reactions. Burning synthesis is possible, and graphitization can be conducted even though a temperature inside a furnace is not so high.

Moreover, it is also preferable that carbon black and a simple substance of at least one element selected from metals, boron and silicon or a compound containing the element are heated and the resulting graphite grains are further oxidized. By the oxidization, coatings of the oxide can be formed mainly on surfaces of the graphite grains, and the graphite grains are much better in oxidation resistance.

The oxidation method is not particularly limited. For example, a method in which grains are treated with a gas having a high temperature capable of oxidation is mentioned. Specifically, a so-called hot gas method in which a hot gas generated by burning air and a fuel is reacted with graphite grains for a prescribed period of time can be mentioned. At this time, when the time of contact with the gas is too long, the overall graphite is oxidized. It is thus necessary to determine such conditions that only a part thereof can be oxidized.

Needless to say, the graphite grains produced by the foregoing process resolve the problems of the invention when used as a refractory raw material as stated above. The process of the invention is useful because it can also be used for other purposes.

The above-obtained graphite grains are blended with the other ingredient to form the refractory raw material composition of the invention. Specifically, a refractory raw material composition comprising a refractory filler and the graphite grains is formed.

The second invention is a refractory raw material composition comprising both carbonaceous grains (A) selected from carbon black and graphite grains obtained by graphitizing carbon black and having a DBP absorption (x) of 80 ml/100 g or more and carbonaceous grains (B) selected from carbon black and graphite grains obtained by graphitizing carbon black and having a DBP absorption (x) of less than 80 ml/100 g.

Carbon black is carbonaceous fine grains with the grain size in the nanometer order which can currently be procured easily, and products with various trade names can easily be obtained according to purposes in view of a grain size, an aggregation condition, a surface condition and the like. Specific examples thereof include furnace black, channel black, acetylene black, thermal black, lamp black, Ketjen black and the like. Carbon black is usually carbonaceous grains having an average primary grain size of 500 nm or less, and graphite grains obtained by graphitizing the same have approximately the same average grain size. The use of the carbonaceous grains having such a fine grain size can make fine the porous structure in the matrix of refractories. Flake graphite and expanded graphite widely used so far as a refractory raw material had both an average grain size greatly exceeding 1 μm and could not provide a fine porous structure in a matrix. However, the use of the fine carbonaceous grains can realize the fine porous structure.

By using the carbonaceous grains (A) having the DBP absorption (x) of 80 ml/100 g or more allows the formation of the quite fine porous structure in the matrix of refractories, and can reduce the dynamic elastic modulus to improve the thermal shock resistance. The DBP absorption (x) here referred to is a value measured by a method defined in A method of "DBP Absorption" in item 9 of JIS K6217. The DBP absorption of the carbonaceous grains (A) is preferably 90 ml/100 g or more, more preferably 100 ml/100 g or more. Further, the DBP absorption of the carbonaceous grains (A) is usually 1,000 ml/100 g or less.

The average primary grain size of such carbonaceous grains (A) is preferably from 10 to 50 nm. When it is less than 50 nm, quite a fine porous structure is easily formed in the matrix of refractories. It is more preferably 45 nm or less. In view of the easy handling, the oxidation resistance and the corrosion resistance, it is preferably 15 nm or more, more preferably 20 nm or more. The average primary grain size can be measured by observation with an electron microscope. At this time, in case of grains having a structure that plural primary grains are aggregated, calculation is conducted on condition that plural primary grains constituting the same are contained.

Moreover, in the carbonaceous grains (A), it is preferable that the ratio (x/y) of the DBP absorption (x) to the DBP absorption (y) of the compressed sample is 1.15 or more. The DBP absorption (y) of the compressed sample here referred to is a value measured by a method defined in "DBP Absorption of Compressed Sample" in item 10 of JIS K6217, and it is a DBP absorption after a compression procedure at a pressure of 165 MPa is repeated four times.

Carbon black includes carbon black comprising spherical single grains and carbon black in the form of an aggregate in which primary grains are mutually aggregated. FIG. 1 is a schematic view of carbon black in the form of an aggregate. As the carbonaceous grains (A) of the invention, grains in the form of an aggregate are preferably used. That the ratio (x/y) of the DBP absorption (x) to the DBP absorption (y) of the compressed sample is 1.15 or more means that carbon black causes more than a certain structural change by the compression procedure. More specifically, it means that a rate of an aggregate to be deformed or destroyed in the compression is high and the DBP absorption is therefore decreased by more than a certain rate. The ratio (x/y) is preferably 1.2 or more, more preferably 1.3 or more. The ratio (x/y) is usually 2 or less.

That the ratio (x/y) is high means that an aggregate tends to be deformed or destroyed when the grains are used as refractories and undergo stress thermally or mechanically. That is, when stress occurs in a matrix in using the grains as refractories, an energy can be absorbed by deformation or destruction of an aggregate to relax the stress. That is, when crack that occurs and proceeds in a matrix reaches carbon black in the form of an aggregate, it blocks the progress thereof, showing that an excellent thermal shock resistance as refractories is provided.

Further, for example, aggregates linearly connected can also work themselves as a reinforcement of a matrix and heat conduction through aggregates is good. In this respect as well, the thermal shock resistance is improved. Besides, in carbon black having a relatively small average primary grain size, such aggregates are often formed. Therefore, formation of fine pores in the matrix is also attained at the same time. That is, it is possible to control quite fine pores in the nanometer order, with the result that refractories excellent in thermal shock resistance are provided. The effects provided by formation of the aggregates are given to not only the use of carbon black but also the use of graphitized carbon black as the carbonaceous grains (A).

Carbon black available as the carbonaceous grains (A) is not particularly limited. Specifically, preferable examples thereof include first extruding furnace black (FEF), super abrasion furnace black (SAF) and high abrasion furnace black (HAF). When graphite grains obtained by graphitizing carbon black are used as the carbonaceous grains (A), preferable graphite grains can be produced using this carbon black as a raw material. Further, the carbonaceous grains (A) may be a mixture of plural types of the carbonaceous grains (A).

When the foregoing carbonaceous grains (A) alone are incorporated in the refractory raw material composition, the thermal shock resistance can be improved by formation of fine pores, but the oxidation resistance and the corrosion resistance tend to decrease. For this reason, the invention uses the carbonaceous grains (A) and the carbonaceous grains (B) in combination.

When the carbonaceous grains (B) selected from carbon black and graphite grains obtained by graphitizing carbon black and having the DBP absorption of less than 80 ml/100 g are used in combination with the carbonaceous grains (A), the packing density of refractories can be increased, and the oxidation resistance and the corrosion resistance can be improved. The DBP absorption of the carbonaceous grains (B) is preferably 60 ml/1000 g or less, more preferably 40 ml/100 g or less. Further, the DBP absorption of the carbonaceous grains (B) is usually 10 ml/100 g or more.

The average primary grain size of such carbonaceous grains (B) is preferably from 50 to 500 nm. When it is 50 nm or more, the packing property is good in the matrix of refractories, and the oxidation resistance and the corrosion resistance are improved. It is more preferably 60 nm or more. When it exceeds 500 nm, the size of the pore in the matrix is too large, and the thermal shock resistance is notably decreased. It is more preferably 200 nm or less, further preferably 100 nm or less.

Such carbonaceous grains (B), unlike the carbonaceous grains (A), less form an aggregate in which primary grains are mutually aggregated, and most of the grains comprise single spheres, which is preferable in view of the packing property. Accordingly, the carbonaceous grains in which the ratio (x/y) of the DBP absorption (x) to the DBP absorption (y) of the compressed sample is less than 1.15 are preferably used. The ratio (x/y) is more preferably 1.1 or less, further preferably 1.05 or less. When carbon black comprises independent spheres which are not mutually aggregated and the structure is never destroyed by the compression, the ratio (x/y) is theoretically 1. Actually, however, it might include some measurement error. The ratio (x/y) as a measured value is usually 0.9 or more. By using in combination the carbonaceous grains (A) mainly having the aggregate structure in which the grains are highly aggregated and the carbonaceous grains (B) mainly containing the single spheres, quite a fine porous structure can be developed while securing the high packing rate.

Carbon black available as the carbonaceous grains (B) is not particularly limited. Specifically, preferable examples thereof include fine thermal black (FT), medium thermal black (MT), semi-reinforcing furnace black (SRF) and general-purpose furnace black (GPF). When graphite grains obtained by graphitizing carbon black are used as the carbonaceous grains (B), preferable graphite grains can be produced using this carbon black as a raw material. Further, the carbonaceous grains (B) may be a mixture of plural types of the carbonaceous grains (B).

The weight ratio (A/B) of the carbonaceous grains (A) to the carbonaceous grains (B) is preferably 1/99 to 99/1. When the weight ratio (A/B) is less than 1/99, the thermal shock resistance might be insufficient. When it exceeds 99/1, the corrosion resistance or the oxidation resistance might be insufficient. The weight ratio (A/B) is more preferably 5/95 or more, further preferably 10/90 or more. The weight ratio (A/B) is more preferably 90/10 or less, further preferably 70/30 or less.

In view of the oxidation resistance and the corrosion resistance, it is preferable that at least the carbonaceous grains (A) or the carbonaceous grains (B) are graphite grains obtained by graphitizing carbon black. The graphite grains areas described in the first invention. Ingraphitizing carbon black, the DBP absorption, the DBP absorption of the compressed sample and the average primary grain size are usually not changed much.

In the invention, it is especially preferable that the carbonaceous grains (A) are graphite grains obtained by graphitizing carbon black. This is because carbon black used as the carbonaceous grains (A) is inferior in corrosion resistance and oxidation resistance to carbon black used as the carbonaceous grains (B) and this defect is offset by the graphitization. A preferable embodiment is that the carbonaceous grains (A) are graphite grains obtained by graphitizing carbon black and the carbonaceous grains (B) are carbon black. In this case, the graphite grains obtained by graphitizing carbon black are more expensive than usual carbon black. Consequently, it is preferable from the economical standpoint that the mixing amount of the carbonaceous grains (A) is smaller than the mixing amount of the carbonaceous grains (B).

A more preferable embodiment of the invention is that both of the carbonaceous grains (A) and the carbonaceous grains (B) are graphite grains obtained by graphitizing carbon black. In this case, the carbonaceous grains (A) and the carbonaceous grains (B) used are both superior in corrosion resistance and oxidation resistance to carbon black. As a result, the corrosion resistance and the oxidation resistance of refractories are more improved.

Further, it is preferable that at least the carbonaceous grains (A) or the carbonaceous grains (B) are graphite grains obtained by graphitizing carbon black and the graphite grains contain at least one element selected from metals, boron and silicon. The oxidation resistance and the corrosion resistance can be improved by not only graphitizing carbon black but also containing at least one element selected from metals, boron and silicon. The "composite graphite grains" containing the graphite grains and the element except carbon are as described in the first invention.

At this time, it is preferable that the carbonaceous grains (A) are graphite grains obtained by graphitizing carbon black and the graphite grains contain at least one element selected from metals, boron and silicon. This is because the carbonaceous grains (A) are inferior in corrosion resistance and oxidation resistance to the carbonaceous grains (B) and this defect can thereby be offset.

At this time, a preferable embodiment is that the carbonaceous grains (A) are graphite grains obtained by graphitizing carbon black, the graphite grains contain at least one element selected from metals, boron and silicon and the carbonaceous grains (B) are ungraphitized carbon black. In this case, since the graphite grains obtained by graphitizing carbon black and containing at least one element selected from metals, boron and silicon are more expensive than usual carbon black, it is preferable that the amount of the carbonaceous grains (A) is smaller than the amount of the carbonaceous grains (B).

Another preferable embodiment is that the carbonaceous grains (A) are graphite grains obtained by graphitizing carbon black, the graphite grains contain at least one element selected from metals, boron and silicon, the carbonaceous grains (B) are graphite grains obtained by graphitizing carbon black and the graphite grains are free from the element. This is because upon comparing these graphite grains, the carbonaceous grains (A) are inferior in corrosion resistance and oxidation resistance to the carbonaceous grains (B) and this defect can be offset by containing at least one element selected from metals, boron and silicon.

The most preferable embodiment of the invention is that both of the carbonaceous grains (A) and the carbonaceous grains (B) are graphite grains obtained by graphitizing carbon black and the graphite grains contain at least one element selected from metals, boron and silicon. In this case, both of the carbonaceous grains (A) and the carbonaceous grains (B) are excellent in corrosion resistance and oxidation resistance in particular, with the result that the corrosion resistance and the oxidation resistance of refractories become quite excellent.

Another ingredient is incorporated in the carbonaceous grains (A) and the carbonaceous grains (B) described above to form the refractory raw material composition of the invention. Specifically, the refractory raw material composition comprising the carbonaceous grains (A), the carbonaceous grains (B) and the refractory filler is provided.

In the refractory raw material composition of the first invention, the refractory filler mixed with the graphite grains is not particularly limited. Further, in the refractory raw material composition of the second invention, the refractory filler mixed with the carbonaceous grains (A) and the carbonaceous grains (B) is not particularly limited. In these refractory raw material compositions, various refractory fillers can be used on the basis of the purpose and the required properties as refractories. Refractory oxides such as magnesia, calcia, alumina, spinel and zirconia, carbides such as silicon carbide and boron carbide, borates such as calcium borate and chromium borate, and nitrates can be used as the refractory filler. Of these, magnesia, alumina and spinel are preferable in consideration of usefulness of the low carbon content, and magnesia is most preferable. As magnesia, an electro-fused or sintered magnesia clinker is mentioned. These refractory fillers are incorporated after adjusting the grain size.

In the refractory raw material composition of the first invention, it is preferable that the mixing amount of the graphite grains is from 0.1 to 10 parts by weight per 100 parts by weight of the refractory filler. In the refractory raw material composition of the second invention, it is also preferable that the total amount of the carbonaceous grains (A) and the carbonaceous grains (B) is from 0.1 to 10 parts by weight per 100 parts by weight of the refractory filler. When the total amount of these grains is less than 0.1 part by weight, the effects provided by the addition of these grains are little found, and the thermal shock resistance is, in many cases, insufficient. It is preferably 0.5 part by weight or more. Meanwhile, when the total amount of these particles exceeds 10 parts by weight, the carbon pickup drastically occurs, the heat dissipation from containers also heavily occur, and the corrosion resistance is decreased. It is preferably 5% by weight or less.

Moreover, as the binder used in the refractory raw material composition of the invention, an ordinary organic binder or inorganic binder can be used. As a highly refractory binder, the use of an organic binder made mainly of a phenol resin, a pitch or the like is preferable. In view of a wettability of a refractory raw material or a high content of residual carbon, a binder made mainly of a phenol resin is more preferable. An organic binder may contain a solvent, and an appropriate viscosity can be provided in blending by containing a solvent. The content of such an organic binder is not particularly limited. It is preferably from 0.5 to 10 parts by weight, more preferably from 1 to 5 parts by weight per 100 parts by weight of the refractory filler.

In the refractory raw material composition of the second invention, a process in which the binder is incorporated in the refractory raw material composition of the invention is not particularly limited. A process in which the carbonaceous grains (A) are previously dispersed in the organic binder and the dispersion is then mixed with the other raw materials is preferable. Since the carbonaceous grains (A) have a small average primary grain size and form an aggregate in many cases, an aggregate tends to be formed in blending with other raw materials. However, after the grains are dispersed in the organic binder by being previously stirred with the organic binder, the dispersion is blended with the other raw materials such as the organic filler and the like, whereby the carbonaceous grains (A) can be dispersed well in the matrix.

At this time, it is possible that both of the carbonaceous grains (A) and the carbonaceous grains (B) are previously dispersed in the organic binder and the dispersion is then blended with the other raw material. In this case, however, the amount of the organic binder based on the total weight of the carbonaceous grains (A) and the carbonaceous grains (B) is small in many cases, and they might not be dispersed well previously. Accordingly, it is preferable that only the carbonaceous grains (A) difficult to disperse are previously dispersed in the organic binder and the dispersion is then blended with the carbonaceous grains (B) and the refractory filler, because the carbonaceous grains (A) can be dispersed well in the matrix.

In the refractory raw material composition of the first invention, the graphite grains are used as the carbonaceous raw material. Further, in the refractory raw material composition of the second invention, the carbonaceous grains (A) and the carbonaceous grains (B) are used as the carbonaceous raw material. In both of the refractory raw material compositions, another carbonaceous raw material may further be used in combination. For example, another graphite ingredient such as flake graphite or expanded graphite may be used in combination, or a pitch, a coke or the like may be used in combination.

The refractory raw material composition of the invention may contain ingredients other than the foregoing unless the gist of the invention is impaired. For example, metallic powders such as aluminum and magnesium, alloy powders, silicon powders and the like may be contained therein. Further, in kneading, an appropriate amount of water or a solvent may be added.

The refractory of the invention is obtained by kneading the thus-obtained refractory raw material composition, molding the composition, and as required, heating the molded product. Here, in the heating, the product may be baked at a high temperature. However, in case of magnesia, the product is only baked at a temperature of, usually, less than 400° C.

A so-called monolithic refractory is included in the refractory raw material composition of the invention when the refractory is monolithic. When the monolithic refractory comes to have a certain form, it is included in the molded refractory of the invention. For example, even a product sprayed on a furnace wall, it is included in the molded refractory of the invention since it has a certain shape.

Since the thus-obtained refractory is excellent in corrosion resistance, oxidation resistance and thermal shock resistance, it is quite useful as a furnace material for obtaining a high-quality metallurgical product.

BEST MODE FOR CARRYING OUT THE INVENTION

The invention is illustrated below by referring to Examples.

In Examples, analysis and evaluation were performed by various methods to follow.

(1) Method for Observing an Average Primary Grain Size

A sample was photographed with 100,000 × magnification using a transmission electron microscope. From the resulting photograph, a number average value of a size was obtained. At this time, when grains of the sample are aggregated, these were considered to be separate grains, and a value was obtained as an average primary grain size.

(2) Method for Calculating Graphite Lattice Spacing

A graphite powder to be intended was measured using a powder X-ray diffractometer. A measurement wavelength $\lambda$ is 1.5418 Å, a wavelength of K$\alpha$ rays of copper. Of crystal peaks obtained by the X-ray diffraction measurement, a large peak of which the value of 2$\theta$ is present near 26° is a peak corresponding to a 002 surface of graphite. From this, the lattice spacing d(Å) of graphite was calculated using the following formula.

$$d=\lambda/2 \sin \theta$$

(3) Apparent Porosity and Bulk Specific Gravity After Treatment at 1,400° C.

A sample cut to 50×50×50 mm was embedded in a coke within an electric furnace, and heat-treated in an atmosphere of carbon monoxide at 1,400° C. for 5 hours. The treated sample was allowed to cool to room temperature, and an apparent porosity and a bulk specific gravity were then measured according to JIS R2205.

(4) Dynamic Elastic Modulus

A sample of 110×40×40 mm was embedded in a coke within an electric furnace, and heat-treated in an atmosphere of carbon monoxide at 1,000° C. or 1,400° C. for 5 hours. The treated sample was allowed to cool to room temperature, and an ultrasonic wave propagation time was measured using an ultrasony scope. A dynamic elastic modulus E was obtained on the basis of the following formula.

$$E=(L/t)^2 \cdot \rho$$

wherein L is an ultrasonic wave propagation distance (length of a sample) (mm), t is an ultrasonic wave propagation time (μsec), and $\rho$ is a bulk specific gravity of a sample.

(5) Oxidation Resistance Test

A sample of 40×40×40 mm was kept in an electric oven (ambient atmosphere) at 1,400° C. for 10 hours, and then cut. Thicknesses of decarbonized layers of three surfaces except a lower surface were measured at the cut face, and an average value thereof was calculated.

(6) Corrosion Resistance Test

A sample of 110×60×40 mm was installed on a rotary corrosion tester, and a test was conducted in which a step of keeping the sample in a slag with a basicity (CaO/SiO$_2$)=1 held at from 1,700 to 1,750° C. was repeated five times. A wear size was measured in a cut surface after the test.

SYNTHESIS EXAMPLE 1

Synthesis of Graphite Grains A (Carbonaceous Grains b)

"Niteron #10 Kai" made by Nippon Steel Chemical Carbon Co., Ltd. was used as a carbon black raw material. This carbon black is carbon black of the type called first extruding furnace black (FEF) in which the average primary grain size is 41 nm, the DBP absorption (x) is 126 ml/100 g and the DBP absorption (y) of the compressed sample is 89 ml/100 g, and it is carbonaceous grains a used in this Example. This carbon black was graphitized by heat treatment in a carbon furnace (FVS-200/200/200, FRET-50, manufactured by Fuji Electronics Industry Co., Ltd.) in an argon gas atmosphere at 2,100° C. for 3 hours to obtain graphite grains A (carbonaceous grains b). When the resulting grains were subjected to the X-ray diffraction measurement, a peak ascribable to a graphite structure was observed, and it was found that graphite grains were formed. Lattice spacing calculated from a diffraction line corresponding to 002 spacing of graphite was 3.40 Å. The average primary grain size of the grains was 38 nm, the DBP absorption (x) thereof was 118 ml/100 g, and the DBP absorption (y) of the compressed sample thereof was 85 ml/100 g.

SYNTHESIS EXAMPLE 2

Synthesis of Graphite Grains B (Carbonaceous Grains e)

Graphite grains B (carbonaceous grains e) were formed in the same manner as in Synthesis Example 1 except that carbon black as a raw material was changed. With respect to carbon black as a raw material, "HTC #20" made by Nippon Steel Chemical Carbon Co., Ltd. was used. This carbon black is carbon black of the type called fine thermal black (FT) in which the average primary grain size is 82 nm, the DBP absorption (x) is 29 ml/100 g and the DBP absorption (y) of the compressed sample is 30 ml/100 g, and it is carbonaceous grains d used in this Example. When the resulting grains were subjected to the X-ray diffraction measurement, a peak ascribable to a graphite structure was observed, and it was found that graphite grains were formed. Lattice spacing calculated from a diffraction line corresponding to 002 spacing of graphite was 3.42 Å. The average primary grain size of the grains was 70 nm, the DBP absorption (x) thereof was 28 ml/100 g, and the DBP absorption (y) of the compressed sample thereof was 28 ml/100 g.

SYNTHESIS EXAMPLE 3

Synthesis of Graphite Grains C (Carbonaceous Grains c)

Figure 2:
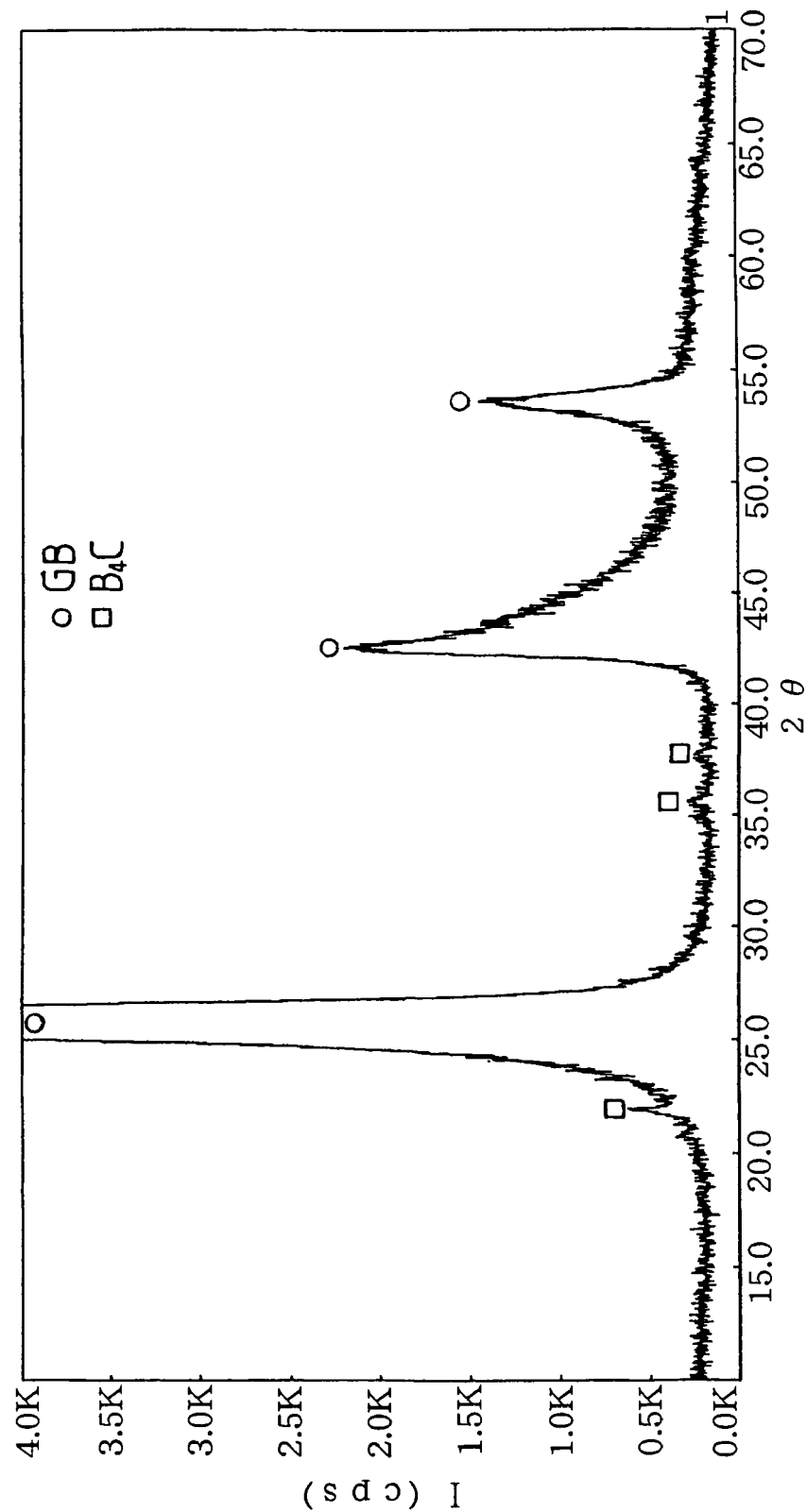

Carbon black "Niteron #10 Kai" and a boron powder were mixed such that a molar ratio of a carbon element to a boron element was 10:4, and the mixture was charged into a silica crucible. A graphite sheet was put on the upper surface of the crucible, and an electrode was connected with both terminals thereof. An electric current was passed through the electrode to generate heat in the graphite sheet and ignite the mixture, and graphite grains C (carbonaceous grains c) were obtained by a self-burning synthesis method using reaction heat generated in the formation of a carbide. When the resulting grains were subjected to the X-ray diffraction measurement, a peak ascribable to a graphite structure was observed, and it was found that graphite grains were formed. Lattice spacing calculated from a diffraction line corresponding to 002 spacing of graphite was 3.38 Å. Further, a peak with $2\theta=37.8°$ ascribable to a 021 diffraction line of $B_4C$ was also identified. The X-ray diffraction chart is shown in FIG. 2. The average primary grain size of the grains was 40 nm, the DBP absorption (x) thereof was 120 ml/100 g, and the DBP absorption (y) of the compressed sample thereof was 86 ml/100 g.

SYNTHESIS EXAMPLE 4

Synthesis of Graphite Grains D

Graphite grains D were obtained in the same manner as in Synthesis Example 3 except that carbon black "HTC #20" and a titanium powder were mixed such that a molar ratio of a carbon element to a titanium element was 10:1. When the resulting grains were subjected to the X-ray diffraction measurement, a peak ascribable to a graphite structure was observed, and it was found that graphite grains were formed. Lattice spacing calculated from a diffraction line corresponding to 002 spacing of graphite was 3.44 Å. Further, a peak with $2\theta=41.5°$ ascribable to a 200 diffraction line of TiC was also identified. The average primary grain size of the grains was 71 nm.

SYNTHESIS EXAMPLE 5

Synthesis of Graphite Grains E (Carbonaceous Grains f)

Graphite grains E (carbonaceous grains f) were obtained in the same manner as in Synthesis Example 3 except that carbon black "HTC #20", an aluminum powder and a titanium oxide powder were mixed such that a molar ratio of a carbon element to an aluminum element to a titanium element was 10:4:3. When the resulting grains were subjected to the X-ray diffraction measurement, a peak ascribable to a graphite structure was observed, and it was found that graphite grains were formed. Lattice spacing calculated from a diffraction line corresponding to 002 spacing of graphite was 3.42 Å. Further, a peak with $2\theta=43.4°$ ascribable to a 113 diffraction line of $Al_2O_3$ and a peak with $2\theta=41.5°$ ascribable to a 200 diffraction line of TiC were also identified. The average primary grain size of the grains was 70 nm, the DBP absorption (x) thereof was 30 ml/100 g, and the DBP absorption (y) of the compressed sample thereof was 29 ml/100 g.

SYNTHESIS EXAMPLE 6

Synthesis of Graphite Grains F

Graphite grains F were obtained in the same manner as in Synthesis Example 3 except that carbon black "HTC #20" and trimethoxyborane were mixed such that a molar ratio of a carbon element to a boron element was 10:1. When the resulting grains were subjected to the X-ray diffraction measurement, a peak ascribable to a graphite structure was observed, and it was found that graphite grains were formed. Lattice spacing calculated from a diffraction line corresponding to 002 spacing of graphite was 3.41 Å. Further, a peak with $2\theta=37.8°$ ascribable to a 021 diffraction line of $B_4C$ was also identified. The average primary grain size of the grains was 72 nm.

SYNTHESIS EXAMPLE 7

Synthesis of Graphite Grains G

The graphite grains C obtained in Synthesis Example 3 were charged into a stainless steel tube, and a hot gas obtained by burning a mixture of propane and oxygen at a volume ratio of 1:8 was introduced therein. The temperature of the hot gas was 1,000° C., and the retention time was 5 seconds. Water was then sprayed to cool the grains to 250° C., and the resulting graphite grains G were trapped with a bag filter. Lattice spacing calculated from a diffraction line corresponding to 002 spacing of graphite was 3.40 Å. Further, a peak with $2\theta=32.1°$ ascribable to a 102 diffraction line of $B_2O_3$ was also identified. The average primary grain size of the grains was 42 nm.

With respect to the graphite grains A to G obtained in Synthesis Examples 1 to 7, the raw materials, the resulting compound and the average primary grain size were all shown in Table 1-1.

TABLE 1-1

|  | Synthesis Example 1 | Synthesis Example 2 | Synthesis Example 3 | Synthesis Example 4 | Synthesis Example 5 | Synthesis Example 6 | Synthesis Example 7 |
|---|---|---|---|---|---|---|---|
| Raw materials*1) | | | | | | | |
| FET (Niteron #10 Kai) | 10 | | 10 | | | | 10 |
| FT (HTC #20) | | 10 | | 10 | 10 | 10 | |
| boron powder | | | 4 | | | | 4 |
| titanium powder | | | | 1 | | | |
| aluminum powder | | | | | 4 | | |
| titanium oxide | | | | | 3 | | |
| trimethoxyborane | | | | | | 1 | |
| Resulting graphite grains | A | B | C | D | E | F | G |
| Resulting mineral | C | C | C | C | C | C | C |
| | | | $B_4C$ | TiC | $Al_2O_3$ TiC | $B_4C$ | $B_2O_3$ |
| Average primary grain size (nm) | 38 | 70 | 40 | 71 | 70 | 72 | 42 |

*1)The figure is a mixing molar ratio of a raw element.

EXAMPLE 1-1

100 parts by weight of electro-fused magnesia having a purity of 98% with a grain size adjusted, 2 parts by weight of the graphite grains A obtained in Synthesis Example 1 and 3 parts by weight of a phenol resin (obtained by adding a curing agent to a novolak-type phenol resin) were mixed, and kneaded with a kneader. After the mixture was molded with a friction press, the molded product was baked at 250° C. for 8 hours. Consequently, after the heat treatment at 1,400° C., the apparent porosity was 9.2%, and the bulk specific gravity was 3.10. Further, after the heat treatment at 1,000° C., the dynamic elastic modulus was 10.8 GPa, and after the heat treatment at 1,400° C., the dynamic elastic modulus was 12.4 GPa. Moreover, the thickness of the decarbonized layer was 7.8 mm, and the wear size was 11.0 mm.

EXAMPLES 1-2 TO 1-11, AND COMPARATIVE EXAMPLES 1-1 TO 1-7

Refractories were produced in the same manner as in Example 1-1 except that the mixing raw materials were changed as shown in Tables 1-2 and 1-3, and they were evaluated. The results are all shown in Tables 1-2 and 1-3.

TABLE 1-2

|  | Ex. 1-1 | Ex. 1-2 | Ex. 1-3 | Ex. 1-4 | Ex. 1-5 | Ex. 1-6 | Ex. 1-7 | Ex. 1-8 |
|---|---|---|---|---|---|---|---|---|
| Mixing raw materials*1) | | | | | | | | |
| magnesia | 100 | 100 | 100 | 100 | 100 | 100 | 100 | 100 |
| graphite A | 2 | | | | | | | |
| graphite B | | 2 | | | | | | |
| graphite C | | | 2 | | | | 1 | |
| graphite D | | | | 2 | 7 | 12 | | 2 |
| FET (Niteron #10 Kai) | | | | | | | | 1 |
| FT (HTC #20) | | | | | | | 1 | |
| flake graphite | | | | | | | | |
| phenol resin | 3 | 3 | 3 | 3 | 3 | 3 | 3 | 3 |
| Apparent porosity (%) after 1,400° C. heat treatment | 9.2 | 8.8 | 8.8 | 8.9 | 9.3 | 9.6 | 8.8 | 9.0 |
| Bulk specific gravity after 1,400° C. heat treatment | 3.10 | 3.13 | 3.12 | 3.12 | 3.07 | 3.01 | 3.11 | 3.10 |
| Dynamic elastic modulus (Gpa) after 1,000° C. heat treatment | 10.8 | 17.1 | 12.0 | 17.8 | 6.7 | 5.1 | 16.4 | 10.1 |
| Dynamic elastic modulus (Gpa) after 1,400° C. heat treatment | 12.4 | 19.9 | 14.6 | 19.0 | 7.3 | 5.4 | 18.0 | 11.2 |
| Thickness of decarbonized layer (mm) | 7.8 | 6.1 | 5.2 | 4.9 | 7.1 | 8.2 | 5.7 | 5.4 |
| Wear size (mm) | 11.0 | 10.4 | 9.5 | 8.8 | 12.7 | 13.5 | 10.0 | 9.3 |

*1)The Mixing ratio is a weight ratio.

TABLE 1-3

|  | Ex. 1-9 | Ex. 1-10 | Ex. 1-11 | CEx. 1-1 | CEx. 1-2 | CEx. 1-3 | CEx. 1-4 | CEx. 1-5 | CEx. 1-6 | CEx. 1-7 |
|---|---|---|---|---|---|---|---|---|---|---|
| Mixing raw materials*1) | | | | | | | | | | |
| magnesia | 100 | 100 | 100 | 100 | 100 | 100 | 100 | 100 | 100 | 100 |
| graphite E | 2 | | | | | | | | | |

TABLE 1-3-continued

|  | Ex. 1-9 | Ex. 1-10 | Ex. 1-11 | CEx. 1-1 | CEx. 1-2 | CEx. 1-3 | CEx. 1-4 | CEx. 1-5 | CEx. 1-6 | CEx. 1-7 |
|---|---|---|---|---|---|---|---|---|---|---|
| graphite F |  | 2 |  |  |  |  |  |  |  |  |
| graphite G |  |  | 2 |  |  |  |  |  |  |  |
| FET (Niteron #10 Kai) |  |  |  | 2 |  |  |  |  |  |  |
| FT (HTC #20) |  |  |  |  | 2 | 7 |  |  |  |  |
| flake graphite |  |  |  |  |  |  |  | 5 | 20 |  |
| expanded graphite |  |  |  |  |  |  |  |  |  | 5 |
| phenol resin | 3 | 3 | 3 | 3 | 3 | 3 | 3 | 3 | 3 | 3 |
| Apparent porosity (%) after 1,400° C. heat treatment | 8.7 | 8.9 | 9.1 | 10.1 | 8.7 | 12.6 | 9.2 | 10.2 | 12.4 | 9.2 |
| Bulk specific gravity after 1,400° C. heat treatment | 3.12 | 3.11 | 3.11 | 3.06 | 3.12 | 2.96 | 3.06 | 2.98 | 2.99 | 3.18 |
| Dynamic elastic modulus (Gpa) after 1,000° C. heat treatment | 18.0 | 17.4 | 20.1 | 7.8 | 17.4 | 4.0 | 28.6 | 16.5 | 22.6 | 30.4 |
| Dynamic elastic modulus (Gpa) after 1,400° C. heat treatment | 18.7 | 19.5 | 21.3 | 9.1 | 19.2 | 3.7 | 27.1 | 15.8 | 20.9 | 34.7 |
| Thickness of decarbonized layer (mm) | 4.7 | 4.5 | 4.2 | 9.7 | 8.0 | 13.7 | 10.9 | 11.9 | 11.2 | 11.8 |
| Wear size (mm) | 9.3 | 8.9 | 8.4 | 13.2 | 11.1 | 24.0 | 17.8 | 21.1 | 19.0 | 18.4 |

*1)The Mixing ratio is a weight ratio.

In case of using graphitized carbon blacks shown in Examples 1-1 and 1-2, in comparison to the case of containing 5 parts by weight of flake graphite or expanded graphite as shown in Comparative Example 1-4 or 1-6, the dynamic elastic modulus is low, the excellent thermal shock resistance is obtained with the less carbon content, the thickness of the decarbonized layer and the wear size are also small, and the excellent oxidation resistance and corrosion resistance are shown. The same thermal shock resistance as in containing 20 parts by weight of flake graphite as shown in Comparative Example 1-5 is attained by the addition of as small as 2 parts by weight.

Further, these Examples show the small thickness of the decarbonized layer, the small wear size, the excellent oxidation resistance and the excellent corrosion resistance in comparison to the case of using ungraphitized carbon blacks shown in Comparative Examples 1-1 and 1-2.

comparison to Examples 1-1 and 1-2 using the graphite grains free from these elements, it is found that the thickness of decarbonized layer and the wear size are smaller, and the oxidation resistance and the corrosion resistance are more improved.

Furthermore, in case of using the graphite grains containing the boron element and oxidized as shown in Example 1-11, in comparison to Example 1-3 using the graphite grains before the oxidation, the oxidation resistance and the corrosion resistance are improved.

Next, with respect to the carbonaceous grains b, c, e and f obtained in Synthesis Examples 1, 3, 2 and 5 and the carbonaceous grains a and d which are carbon blacks as raw materials used in these Synthesis Examples, the raw materials, the treatment method, the DBP absorption (x), the DBP absorption (y) of the compressed sample, the ratio (x/y) and the average primary grain size were all shown in Table 2-1.

TABLE 2-1

|  | Carbonaceous grains (A) | | | Carbonaceous grains (B) | | |
|---|---|---|---|---|---|---|
|  | Carbonaceous grains a | Carbonaceous grains b | Carbonaceous grains c | Carbonaceous grains d | Carbonaceous grains e | Carbonaceous grains f |
| Raw materials*1) |  |  |  |  |  |  |
| FET (Niteron #10 Kai) | 10 | 10 | 10 |  |  |  |
| FT (HTC #20) |  |  |  | 10 | 10 | 10 |
| boron powder |  |  | 4 |  |  |  |
| aluminum powder |  |  |  |  |  | 4 |
| titanium oxide |  |  |  |  |  | 3 |
| Carbon black treatment method | untreated | Synthesis Example 1 | Synthesis Example 2 | untreated | Synthesis Example 3 | Synthesis Example 4 |
| DBP absorption (x) (ml/100 g) | 126 | 118 | 120 | 29 | 28 | 30 |
| DBP (y) of compressed sample (ml/100 g) | 89 | 85 | 86 | 30 | 28 | 29 |
| Ratio (x/y) | 1.42 | 1.39 | 1.4 | 0.97 | 1 | 1.03 |
| Average primary grain size (nm) | 41 | 38 | 40 | 82 | 70 | 70 |

*1)The figure is a mixing molar ratio of a raw element.

These facts prove the superiority of using the quite fine grains in the nanometer order and the superiority of using the graphitized grains.

Still further, in Examples 1-3, 1-4, 1-9 and 1-10 using the graphite grains containing boron, titanium or aluminum, in

EXAMPLE 2-1

100 parts by weight of electro-fused magnesia having a purity of 98% with a grain size adjusted as a refractory filler, 0.5 part by weight of carbon black "Niteron #10 Kai"

(carbonaceous grains a) as carbonaceous grains (A), 1.5 parts by weight of carbon black "HTC #20" (carbonaceous grains d) as carbonaceous grains (B) and 3 parts by weight of a phenol resin (obtained by adding a curing agent to a novolak-type phenol resin containing a solvent) were mixed, and kneaded with a kneader. After the mixture was molded with a friction press, the molded product was baked at 250° C. for 8 hours to obtain a refractory. The resulting refractory was evaluated. Consequently, after the heat treatment at 1,400° C., the apparent porosity was 8.8%, and the bulk specific gravity was 3.10. Further, after the heat treatment at 1,000° C., the dynamic elastic modulus was 11.3 GPa. After the heat treatment at 1,400° C., the dynamic elastic modulus was 12.7 GPa. The thickness of the decarbonized layer was 7.7 mm, and the wear size was 10.8 mm.

EXAMPLES 2-2 TO 2-10, AND COMPARATIVE EXAMPLES 2-1 TO 2-5

Refractories were produced in the same manner as in Example 2-1 except that the mixing raw materials were changed as shown in Tables 2-2 and 2-3, and they were evaluated. The results are all shown in Tables 2-2 and 2-3.

EXAMPLE 2-11

The test was conducted using the same amounts of the same raw materials as in Example 2-2 and changing the mixing method only. First, 0.2 part by weight of carbon black "Niteron #10 Kai" (carbonaceous grains a) and 3 parts by weight of the same phenol resin as used in Example 2-1 were charged into a universal mixing stirrer manufactured by Dalton Corporation, and mixed. The resulting mixture was mixed with 1.8 parts by weight of carbon black "HTC #20" (carbonaceous grains d) and 100 parts by weight of the same fused magnesia as used in Example 2-1, and kneaded with a kneader. After the mixture was molded with a friction press, the molded product was baked at 250° C. for 8 hours to obtain a refractory. The resulting refractory was evaluated, and the results are all shown in Tables 2-2 and 2-3.

TABLE 2-2

|  | Ex. 2-1 | Ex. 2-2 | Ex. 2-3 | Ex. 2-4 | Ex. 2-5 | Ex. 2-6 | Ex. 2-7 | Ex. 2-8 |
|---|---|---|---|---|---|---|---|---|
| Mixing raw materials (weight ratio) | | | | | | | | |
| magnesia | 100 | 100 | 100 | 100 | 100 | 100 | 100 | 100 |
| carbonaceous grains a | 0.5 | 0.2 | 1 | 1.8 | | | | |
| carbonaceous grains b | | | | | 0.5 | 0.5 | | |
| carbonaceous grains c | | | | | | | 0.5 | 0.5 |
| carbonaceous grains d | 1.5 | 1.8 | 1 | 0.2 | 1.5 | | 1.5 | |
| carbonaceous grains e | | | | | | 1.5 | | 1.5 |
| phenol resin | 3 | 3 | 3 | 3 | 3 | 3 | 3 | 3 |
| Apparent porosity (%) after 1,400° C. heat treatment | 8.8 | 8.7 | 9.5 | 10.4 | 8.7 | 8.4 | 8.7 | 8.6 |
| Bulk specific gravity after 1,400° C. heat treatment | 3.10 | 3.11 | 3.06 | 3.05 | 3.10 | 3.11 | 3.11 | 3.12 |
| Dynamic elastic modulus (GPa) after 1,000° C. heat treatment | 11.3 | 13.6 | 10.1 | 8.0 | 11.5 | 11.8 | 11.6 | 11.7 |
| Dynamic elastic modulus (GPa) after 1,400° C. heat treatment | 12.7 | 15.7 | 10.5 | 8.9 | 12.9 | 13.0 | 13.2 | 13.5 |
| Thickness (mm) of decarbonized layer | 7.7 | 7.9 | 7.9 | 8.5 | 7.4 | 6.5 | 6.9 | 5.5 |
| Wear size (mm) | 10.8 | 10.8 | 10.9 | 12.1 | 10.4 | 9.2 | 10.2 | 8.3 |

TABLE 2-3

|  | Ex. 2-9 | Ex. 2-10 | Ex. 2-11 | CEx. 2-1 | CEx. 2-2 | CEx. 2-3 | CEx. 2-4 | CEx. 2-5 |
|---|---|---|---|---|---|---|---|---|
| Mixing raw materials (weight ratio) | | | | | | | | |
| magnesia | 100 | 100 | 100 | 100 | 100 | 100 | 100 | 100 |
| carbonaceous grains a | | 4 | 0.2 | 2 | | | | |
| carbonaceous grains c | 0.5 | | | | | | | |
| carbonaceous grains d | | 8 | 1.8 | | 2 | | | |
| carbonaceous grains f | 1.5 | | | | | | | |
| flake graphite | | | | | | | 5 | |
| expanded graphite | | | | | | | | 5 |
| phenol resin | 3 | 3 | 3 | 3 | 3 | 3 | 3 | 3 |
| Apparent porosity (%) after 1,400° C. heat treatment | 8.5 | 12.8 | 8.5 | 10.1 | 8.7 | 9.2 | 9.2 | 12.4 |
| Bulk specific gravity after 1,400° C. heat treatment | 3.13 | 2.97 | 3.11 | 3.06 | 3.12 | 3.18 | 3.06 | 2.99 |
| Dynamic elastic modulus (GPa) after 1,000° C. heat treatment | 11.9 | 2.2 | 13.2 | 7.8 | 17.4 | 30.4 | 28.6 | 22.6 |

TABLE 2-3-continued

| | Ex. 2-9 | Ex. 2-10 | Ex. 2-11 | CEx. 2-1 | CEx. 2-2 | CEx. 2-3 | CEx. 2-4 | CEx. 2-5 |
|---|---|---|---|---|---|---|---|---|
| Dynamic elastic modulus (GPa) after 1,400° C. heat treatment | 13.8 | 2.3 | 15.1 | 9.1 | 19.2 | 34.7 | 27.1 | 20.9 |
| Thickness (mm) of decarbonized layer | 4.6 | 13.9 | 7.6 | 9.7 | 8.0 | 11.8 | 10.9 | 11.2 |
| Wear size (mm) | 7.4 | 20.2 | 10.5 | 13.2 | 11.1 | 18.4 | 17.8 | 19.0 |

In Examples 2-1 to 2-4, carbon black [carbonaceous grains (A)] having the DBP absorption of 80 ml/100 g or more and carbon black [carbonaceous grains(B)] having the DBP absorption of less than 80 ml/100 g are both used, and mixed. Consequently, the low dynamic elastic modulus is shown to provide the good thermal shock resistance. Further, the thickness of the decarbonized layer is also small to show the good oxidation resistance. The wear size is also small to show the good wear resistance. On the contrary, in Comparative Example 2-1 using only carbon black [carbonaceous grains (A)] having the DBP absorption of 80 ml/100 g or more, the thickness of the decarbonized layer is great to show the poor oxidation resistance. The wear size is also large to show the poor wear resistance. In Comparative Example 2-2 using only carbon black [carbonaceous grains (B)] having the DBP absorption of less than 80 ml/100 g, the dynamic elastic modulus is high to show the poor thermal shock resistance.

As the carbonaceous grains (A) are added at a ratio of 10/100 (Example 2-2), 25/100 (Example 2-1) or 50/100 (Example 2-3) based on the total amount of the carbonaceous grains (A) and (B), the dynamic elastic modulus is much decreased in comparison to Comparative Example 2-2 using only the carbonaceous grains (B). For example, in Example 2-2, with the addition of the carbonaceous grains (A) at a low ratio of 10/100, the dynamic elastic modulus is greatly improved from 17.4 GPa to 13.6 GPa after the heat treatment at 1,000° C., and from 19.2 GPa to 15.7 GPa after the heat treatment at 1,400° C. At this time, in these Examples 2-1 to 2-3, both of the thickness of the carbonized layer and the wear size show rather smaller values than in Comparative Example 2-2 using only the carbonaceous grains (B). Not only is the thermal shock resistance greatly improved, but also the oxidation resistance and the wear resistance are excellent.

Meanwhile, in Example 2-4 using further the carbonaceous grains (B) at a ratio of 10/100 based on the total amount of (A) and (B), the dynamic elastic modulus is greatly improved in comparison to Comparative Example 2-1 using only the carbonaceous grains (A), while the oxidation resistance and the wear resistance are approximately the same as in Comparative Example 2-1. That is, in comparison to the use of the carbonaceous grains (B) only, the additional use of the small amount of the carbonaceous grains (A) can provide the refractory excellent in thermal shock resistance, oxidation resistance and wear resistance.

In Comparative Example 2-3 in which the carbonaceous grains are not incorporated, the thermal shock resistance is notably deteriorated, and the oxidation resistance and the corrosion resistance are also poor. Further, in case of using flake graphite (Comparative Example 2-4) or expanded graphite (Comparative Example 2-5) as a carbonaceous raw material, the thermal shock resistance is worse than in Examples 2-1 to 2-4 even though this graphite is used in an amount of 5 parts by weight which is larger than 2 parts by weight, the use amount of carbon black in Examples 2-1 to 2-4. At this time, both of oxidation resistance and wear resistance are worse than in Examples 2-1 to 2-4.

In case the graphite grains obtained by graphitizing carbon black are used as the carbonaceous grains (A) (Example 2-5), the oxidation resistance and the corrosion resistance are improved in comparison to the case of using carbon black as both of the carbonaceous grains (A) and (B) (Example 2-1). Further, in case the graphite grains obtained by graphitizing carbon black and containing at least one element selected from metals, boron and silicon (Example 2-7) are used as the carbonaceous grains (A), the oxidation resistance and the corrosion resistance are more improved.

In case the graphite grains obtained by graphitizing carbon black are used as both of the carbonaceous grains (A) and (B), the oxidation resistance and the corrosion resistance are more improved than in Example 2-5. Besides, in case the carbonaceous grains (A) are the graphite grains obtained by graphitizing carbon black and containing at least one element selected from metals, boron and silicon (Example 2-8), the oxidation resistance and the corrosion resistance are much more improved. In case the graphite grains obtained by graphitizing carbon black and containing at least one element selected from metals, boron and silicon are used as both of the carbonaceous grains (A) and (B), the best results of the oxidation resistance and the corrosion resistance are provided.

In addition, in Example 2-11, the mixture of the same raw materials at the same mixing ratio as in Example 2-2 is used, and the carbonaceous grains (A) are previously dispersed in the organic binder and then mixed with the other raw materials. Consequently, the dispersibility of the carbonaceous grains (A) in the matrix is improved, with the result that the thermal shock resistance, the oxidation resistance and the corrosion resistance are improved in comparison to Example 2-2 in which all of the raw materials are mixed at the same time.

INDUSTRIAL APPLICABILITY

As has been thus far described, the invention can provide the refractories excellent in corrosion resistance, oxidation resistance and thermal shock resistance, especially the carbon-contained refractories having the low carbon content. Such carbon-contained refractories having the low carbon content are useful because they exhibit less carbon pickup in a molten steel and cause less heat dissipation from containers. Further, the invention can also provide the refractory raw materials for obtaining such refractories.

The invention claimed is:
1. A refractory which is obtained by molding a composition comprising a refractory filler and graphite grains, wherein the graphite grains comprise at least one element selected from the group consisting of metals, boron and silicon, and have an average grain size of 500 nm or less.

2. The refractory as claimed in claim 1, wherein the composition comprises 100 parts by weight of the refractory filler and from 0.1 to 10 parts by weight of the graphite grains.

3. The refractory as claimed in claim 1, wherein the refractory filler comprises magnesia.

4. The refractory as claimed in claim 1, wherein the graphite grains have an average grain size of 100 nm or less.

5. The refractory as claimed in claim 1, wherein the graphite grains have a DBP absorption (x) of 80 ml/100 g or more.

6. The refractory as claimed in claim 1, wherein a ratio (x/y) of a DBP absorption (x) of the graphite grains to a DBP absorption (y) of a compressed sample of the graphite grains is 1.15 or more.

7. The refractory as claimed in claim 1, wherein the composition further comprises carbon black having a DBP absorption (x) of less than 80 ml/100 g.

8. A refractory which is obtained by molding a composition comprising a refractory filler and graphite grains, wherein the graphite grains comprise at least one element selected from the group consisting of metals, boron and silicon, and are obtained by graphitizing carbon black.

9. The refractory as claimed in claim 8, wherein the composition comprises 100 parts by weight of the refractory filler and from 0.1 to 10 parts by weight of the graphite grains.

10. The refractory as claimed in claim 8, wherein the refractory filler comprises magnesia.

11. The refractory as claimed in claim 8, wherein the graphite grains have an average grain size of 100 nm or less.

12. The refractory as claimed in claim 8, wherein the graphite grains have a DBP absorption (x) of 80 ml/100 g or more.

13. The refractory as claimed in claim 8, wherein the ratio (x/y) of a DBP absorption (x) of the graphite grains to a DSP absorption (y) of a compressed sample of the graphite grains is 1.15 or more.

14. The refractory as claimed in claim 8, wherein the composition further comprises carbon black having a DBP absorption (x) of less than 80 ml/100 g.

* * * * *